Aug. 6, 1968  W. M. ROBINSON  3,396,319
THERMALLY FUSED CAPACITOR
Filed March 8, 1965
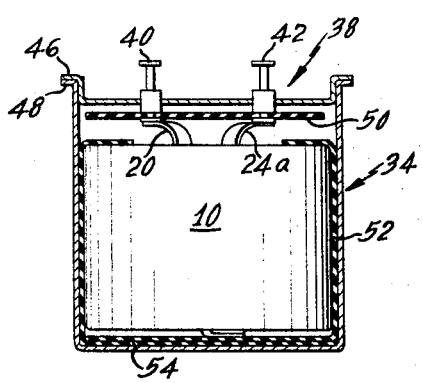
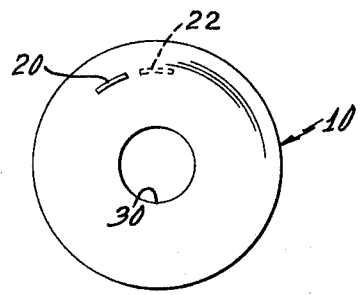
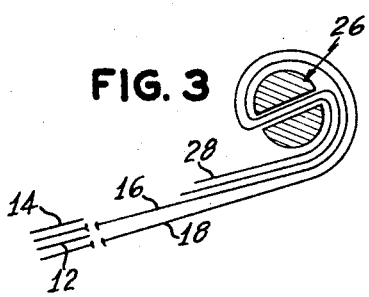
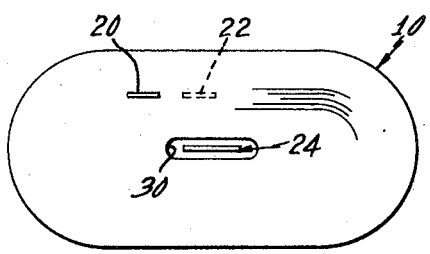
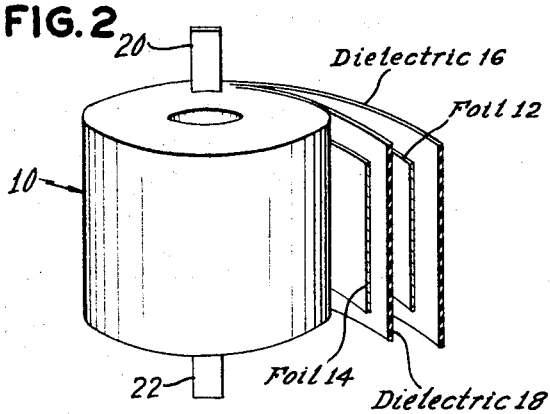
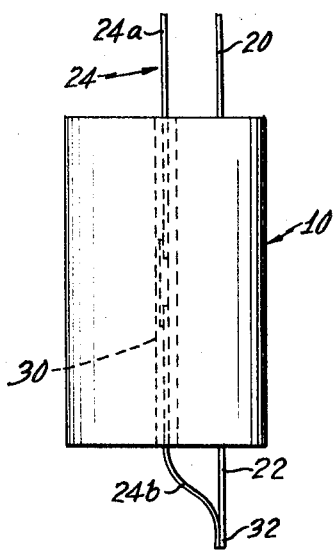
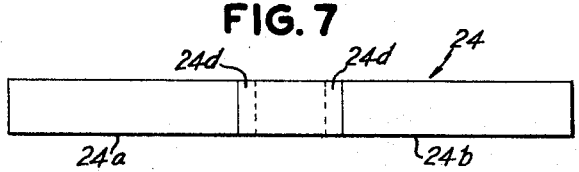
INVENTOR.
William M. Robinson
BY Richard M. Rabkin
ATTORNEY

United States Patent Office 3,396,319
Patented Aug. 6, 1968

3,396,319
THERMALLY FUSED CAPACITOR
William M. Robinson, New Bedford, Mass., assignor to Cornell-Dubilier Electric Corporation, a corporation of Delaware
Filed Mar. 8, 1965, Ser. No. 437,835
8 Claims. (Cl. 317—247)

ABSTRACT OF THE DISCLOSURE

A thermally fused capacitor wherein the fuse, which is positioned within the hollow core of the winding, is separated by multiple layers of dielectric from the electrodes.

---

This invention relates to electric capacitors or condensers and more particularly to a liquid-filled, metal-encased hermetically sealed capacitor which incorporates a thermal fuse.

Hermetically sealed capacitors filled with liquid dielectric are widely used as for example in association with the ballast transformers in fluorescent lighting fixtures. Such capacitors are energized continuously by alternating current for extended periods of time. In use a gradual degeneration of the dielectric materials occurs. This degeneration is reflected in an increase in power losses within the capacitor and concomitantly in increased heating of the capacitor. As a consequence of the increased heating the dissipation factor of the dielectric is raised resulting in an increase in the power losses which result in a temperature rise and consequent further increase in the dissipation factor. This cummulative condition is known as "thermal runaway" of the capacitor. Unless some means is provided for curbing the operation of the capacitor, the increase in internal heat results in the expansion of the dielectric fluid and also in the generation of gas pressure within the capacitor case due to breakdown of the dielectric. The increase in pressure which the capacitor can safely sustain is limited by the strength of the capacitor enclosure. When the capacitor enclosure is stressed to the bursting point, the unit explodes. The dielectric fluid is ejected from the enclosure under pressure. It is an object of this invention to provide a capacitor which is safeguarded against thermal runaway.

It is another object of this invention to provide a thermally fused capacitor which can be conveniently assembled readily and economically.

It is another object of this invention to provide a fused capacitor which is thermally limited.

A further object of the invention resides in providing a wound thermally fused capacitor wherein the fuse may be readily connected to any desirable part of the winding, particularly for minimizing the heat generated in the foil electrodes due to normal flow of current when connected in an alternating-current circuit.

The invention will be better understood from the following description when taken in conjunction with the accompanying drawings in which:

FIG. 1 is a front sectional view of an assembled enclosed capacitor;

FIG. 2 is a perspective view of a conventional wound capacitor section, shown partially unwound;

FIG. 3 is a representation of the initial winding operation of the capacitor section viewed from the end thereof and with a split winding mandrel shown in cross-section;

FIG. 4 is an end view of a capacitor section at the completion of the winding operation and after the removal from the winding mandrel;

FIG. 5 is an end view of the capacitor section of FIG. 4 after it has been flattened;

FIG. 6 is an elevational view on an enlarged scale of the wound capacitor body; and FIG. 7 is a plan view of a thermal fuse element.

Referring to FIG. 2, the capacitor section 10 comprises a pair of electrodes or longitudinally extending strips of foil 12 and 14, of conducting material such as aluminum, and a pair of longitudinally extending strips 16 and 18 of insulating or dielectric material such as paper. The strips of foil 12, 14 and dielectric 16, 18 are alternately disposed and are wound into a compact capacitor body 10. For purposes of illustration the strips of dielectric 16, 18 are shown as single layers but normally comprise multiple strips of dielectric. The strips of dielectric are wider than the strips of conducting material and project a sufficient distance beyond the longitudinal edges thereof so as to prevent short circuiting between alternately disposed conducting foils.

Referring to FIG. 3 the capacitor section 10 is wound on a conventional machine which includes a split mandrel 26. The end of the strips of insulation 16, 18 are received between the portions of the mandrel 26 and are doubled back as at 28 to provide multiple layers of dielectric material about the mandrel. After the multiple turns of insulation have been wound about the mandrel the foils 12 and 14 are introduced. The oppositely extending tap straps 20 and 22, which are of conducting material such as tinned copper strips, are placed in engagement with the foils at the mid point of the length of the foils 12 and 14, respectively. In the illustrated capacitor, both tap straps are positioned at the mid points of their respective foils. The winding operation continues until the full lengths of foil and dielectric have been incorporated. By positioning tap straps 20 and 22 at the mid-points of the foils 12, 14 the $I^2R$ losses due to the normal flow of alternating current along the foils is minimized. Since this loss is reflected in heat generated within the capacitor therefore the illustrated capacitor construction is cooler in operation than units having the tap strap connections at the ends of the foils. Further, connection at mid points of the foils reduces the inductance of the capacitor winding.

The capacitor body 10 when removed from the winding mandrel has the configuration substantially as shown in FIG. 4 with one tap strap 20 extending from one end and the other tap strap 22 extending from the other end of the winding. Hollow core 30 is formed by the removal of mandrel 26 and is defined by the multiple turns of doubled-back dielectric strips 16, 18 formed at the start of the winding operation before winding of the foils 12 and 14 starts.

Referring to FIG. 7 the fuse element 24 comprises two sections of tap strap material 24a and 24b which are connected by a section 24c of relatively low-melting point metal compared to that of the tap strap and foils. Fuse section 24c is preferably a strip of tin having a thickness varying from .002" to about .005" as required. Its cross-section is made amply large so that it does not blow due to the $I^2R$ heating in the fuse resulting from the flow of even higher-than normal current in the capacitor. Fuse section 24c is connected to the tap strap material at 24d by well-known techniques such as welding. In the illustrated embodiment the operation or melting of the fuse element 24c is confined to the interior of the capacitor body 10 where it is surrounded by the previously described multiple turns of dielectric strips of insulation. If desired, the entire fuse element 24 may be fabricated from the relatively low-melting point material although the use of tap straps as shown is preferred since the fuse terminals thus provided resist breakage in the further manufacture of the capacitor. The melting of the fuse element will occur within the body of the capacitor since it is in the area of higher temperature whereas the terminal portions (even when made of low-melting-point metal) are external and are therefore cooler.

Referring to FIG. 5 the fuse element 24 is inserted into the bore 30 and the capacitor body is then flattened to close the bore thus securing the fuse element within the capacitor body. The separation between the walls of the bore 30 and the fuse element 24 as shown in the drawings is exaggerated for purposes of clarity. The end 24b of the fuse element is then joined, as by welding, to the tap strap at 32 (FIG. 6).

Referring to FIG. 1, the capacitor section 10 together with the fuse element 24 are illustrated in the assembled condition, forming capacitor 34. Typically, such a capacitor is rated at 4 mfd. at 600 volts, 60 cycles. A drawn metal can 36 is joined to header assembly 38 to form the enclosure or casing of the capacitor. Header assembly 38 includes a pair of pass-through hermetically sealed insulated terminals 40 and 42 which are secured to a metal cover 44. Flange 46 of the cover engages and is subsequently soldered or seam-welded to a corresponding flange 48 on the can 36. An insulating plate 50 is supported within the capacitor by the terminals 40 and 42 to prevent contact of the tap strap 20 and fuse 24 with the cover 44. Tap strap 20 and fuse terminal 24a are connected, as by welding, to the terminals 40 and 42 respectively. Capacitor body 10 is surrounded by an insulation wrapper 52 which spaces the body 10 from the walls of the enclosure. The depending tap strap 22 and the end of the fuse element 24 secured thereto are bent over against the capacitor body and are received in the space between the insulation wrapper 52 and the capacitor section. The tap strap 22 and fuse terminal 24b may be bent over against the body 10 because they are insulated from the foils 12 and 14 by the laterally extending margins of the layers of dielectric 16 and 18. A liner 54 of insulation is positioned between the bottom of the wrapper 52 and the enclosure 36.

After flanges 46 and 48 are joined, completely sealing the metal case except for a port (not shown) in the cover, the assembly is subjected to a vacuum impregnation process. The capacitor section 10 is impregnated and the rest of the space in the enclosure is filled with dielectric oil and the port is then sealed. Dichlorinated phenyl may be advantageously employed as the dielectric fluid.

Dielectric fluid filled capacitors of the illustrated type have a normal maximum operating temperature at the core 30 of approximately 105° C. When the temperature at the core approaches the melting point of the fusible element, 232° C. in the case of a fuse formed of tin, it is a sign that degeneration has definitely progressed to the point that failure is imminent. This temperature is nevertheless below that at which explosive pressure develops in the casing. The center of the capacitor winding, i.e., the bore 30, is the hottest point in the body. Therefore, the placement of the relatively low melting point fuse element 24 within the bore is particularly advantageous allowing opening of the capacitor circuit before the dangerous temperatures are reached.

A common form of tap or electrical connection to the foils is a "flag tab" which is formed of a piece of flag foil that lies against the electrode foil plus a strip of metal extending parallel to the axis of the winding usually welded to the flag foil. The strip of metal projects beyond one end of the winding. A "tab" is a convenient term signifying both the tap strap type of connection and the equivalent flag tab type of connection.

While one embodiment of the invention has been shown and described in detail it will be recognized by those skilled in the art that various changes and modifications may be made herein without departing from the spirit and scope of the invention.

What I claim is:

1. An electric capacitor comprising a winding of a plurality of alternating strips of conducting material and dielectric material, said winding having hollow core, a plurality of turns of said dielectric material defining said core, a first tab electrically connected to one of said strips of conducting material and having a terminal portion extending beyond one end of the winding, a second tab electrically connected to another of said conducting strips and extending beyond one end of said winding, a thermal responsive fuse, said fuse being positioned within said core of said winding, said fuse having one terminal electrically connected to said second tab, the opposite terminal of said fuse and said first tab constituting terminals of the capacitor.

2. A thermally fused electrical capacitor of the type having a sealed metal casing, a pair of external terminals, a winding within said casing, and dielectric liquid impregnating said winding and filling the otherwise unoccupied space about said winding in said metal casing, said winding having a plurality of strips of conducting material and strips of dielectric material separating the strips of conducting material, and said winding having a hollow core, a first tab electrically connected to one of said strips of conducting material and having a terminal portion extending beyond one end of the winding, a second tab electrically connected to another of said conducting strips and extending beyond one end of said winding, said capacitor further including a thermal fuse having a melting point above the normal operating temperature of the capacitor but below the temperature at which explosive pressure develops in said casing, said fuse being positioned within the core of said winding and there being surrounded by multiple turns of dielectric, said fuse having one terminal electrically connected to said second tab, the opposite terminal of said fuse and said first tab being connected to said external terminals of the capacitor.

3. A capacitor according to claim 2 wherein said thermal fuse is elongated and extends through said winding and has first and second terminals beyond the respective ends of the winding, and wherein said first tab extends from one end of said winding and said second tab extends from the other end of said winding, said first terminal of said fuse and said first tab being connected to said external terminals of said capacitor and second terminal of said fuse being electrically connected to said second tab, and wherein the longitudinal edges of said strips of conducting material are recessed relative to the longitudinal edges of said strips of dielectric material.

4. A capacitor according to claim 3 wherein said tabs which extend from opposite ends of the winding as aforesaid are in contact with and make electrical connection to said strips of conducting material substantially midway along the lengths of such strips.

5. A thermally fused electric capacitor comprising a winding having a pair of conducting strips and dielectric strips separating said conducting strips, said winding having a central passage, first and second tabs electrically connected to said conducting strips, respectively, said first and second tabs projecting from first and second ends of said winding, an elongated thermal fuse extending through said passage so as to have first and second terminal portions projecting from said first and second ends of said winding, respectively, said fuse being surrounded by multiple turns of dielectric said multiple turns of dielectric located within said passage, said first tab and said first terminal portion of the fuse which extend from said first end of the winding constituting terminals of the fused capacitor, and said second tab and said second terminal portion of the fuse being joined together, said fuse having a thermal-responsive mid-portion between said terminal portions disposed within said passage.

6. A capacitor according to claim 5 wherein said first and second tabs are connected to respective ones of said strips of conducting material substantially at the midpoints of the length of such strips to thereby minimize heating of said capacitor due to current flow along the conducting strips.

7. A capacitor according to claim 5 wherein said strips of dielectric material extend beyond the longitudinal edges of said strips of conducting material and the connected portions of said fuse and second tab extend beyond said winding and are in contact with the end of said winding defined by the longitudinal edges of said strips of dielectric material.

8. An electric capacitor comprising a plurality of elongated strips of conducting material and dielectric material alternately disposed and wound into a roll having an axial opening each of said strips of conducting material being inwardly spaced from the free end of the strips of dielectric material at the axis of the roll, whereby when the roll is wound with the winding arbor spaced from the ends of the conducting strips by a distance several times the diameter of the arbor, a plurality of layers of dielectric material will be defined between the axial opening and the next adjacent strip of conducting material, a pair of terminal strips secured respectively to at least two of the strips of conducting material and protruding beyond the capacitor, the protruding end of one of said terminal strips defining a connecting portion and a strip of heat responsive material positioned in said axial opening, one end of said strip of heat responsive material being electrically connected to the protruding end of the other of said terminal strips and the other end of said heat responsive strip defining a second connecting portion.

References Cited
UNITED STATES PATENTS

| | | | |
|---|---|---|---|
| 3,178,622 | 4/1965 | Paul | 317—256 |
| 3,236,976 | 2/1966 | Rayno | 317—12 X |

LARAMIE E. ASKIN, *Primary Examiner.*